US012608142B1

(12) United States Patent
Eškić

(10) Patent No.: US 12,608,142 B1
(45) Date of Patent: Apr. 21, 2026

(54) DATA STORAGE SECURITY SYSTEM AND METHOD OF STORAGE ONLINE DATA TO SECURE AIR-GAPPED OFFLINE MULTI-STORAGE

(71) Applicant: InfoLAB e.i.d.o.o., Zagreb (HR)

(72) Inventor: Imran Eškić, Zagreb (HR)

(73) Assignee: INFOLAB E.I.D.O.O., Zagreb (HR)

( * ) Notice: Subject to any disclaimer, the term of this patent is extended or adjusted under 35 U.S.C. 154(b) by 0 days.

(21) Appl. No.: 19/290,836

(22) Filed: Aug. 5, 2025

Related U.S. Application Data

(63) Continuation of application No. 18/924,633, filed on Oct. 23, 2024, now abandoned.

(51) Int. Cl.
G06F 3/06 (2006.01)

(52) U.S. Cl.
CPC .......... G06F 3/0622 (2013.01); G06F 3/0655 (2013.01); G06F 3/0676 (2013.01); G06F 3/0679 (2013.01)

(58) Field of Classification Search
CPC .... G06F 3/0622; G06F 3/0655; G06F 3/0676; G06F 3/0679
USPC .................................................. 711/163, 154
See application file for complete search history.

(56) References Cited

U.S. PATENT DOCUMENTS

| | | | |
|---|---|---|---|
| 11,425,102 B2 | 8/2022 | Voss | |
| 11,544,393 B2 | 1/2023 | Lockman et al. | |

| | | | |
|---|---|---|---|
| 2017/0262650 A1 | 9/2017 | Patel et al. | |
| 2020/0065502 A1* | 2/2020 | Lockman | .............. G06F 9/4806 |
| 2020/0317445 A1* | 10/2020 | Schultz | ................ B65G 1/0435 |
| 2021/0110068 A1 | 4/2021 | Voss | |
| 2022/0237085 A1 | 7/2022 | Piotrowski | |
| 2023/0141909 A1* | 5/2023 | Truscott | .............. G06F 11/1469 726/23 |

FOREIGN PATENT DOCUMENTS

WO      WO 2021/076370 A1      4/2021

OTHER PUBLICATIONS

U.S. Appl. No. 18/924,633, filed Oct. 23, 2024, Eškić.
Extended European Search Report (nine pages) dated Feb. 9, 2026 out of related European Application No. EP 25 19 8281.

(Continued)

*Primary Examiner* — Hashem Farrokh
(74) *Attorney, Agent, or Firm* — Crowell & Moring LLP

(57) ABSTRACT

A data storage security system includes an end-user device and a transitory R/W storage unit conditionally connected to the outside world via a first air gap or to an offline storage system via a second air gap. The system includes a process control unit that controls all data cycles according to a predefined schedule and is equipped with tamper-responsive and tamper-resistant properties to protect against unauthorized access. A plurality of "n" cold data storage units that are never directly connected to the outside world and are protected from unauthorized access, and an immutable PLC switch that connects the cold data storage units to the data unit and the second air gap to the transitory R/W storage unit. The system provides unidirectional data transfer from the outside world to the offline storage system, and system status communication and monitoring through communication isolation element connections to prevent external tampering.

19 Claims, 7 Drawing Sheets

(56) References Cited

OTHER PUBLICATIONS

Charbax: "QNAP Airgap Backup & Hybrid 1-15 INV. Backup Center for Enhanced NAS Security, H04L9/40 cross-site NAS backup"; Jun. 9, 2024 (Jun. 9, 2024), XP No. 93357801, Retrieved from the Internet: URL:https://www.youtube.com/watch?v=lfzCv89qfCo.

* cited by examiner

DATA STORAGE SECURITY SYSTEM AND METHOD OF STORAGE ONLINE DATA TO SECURE AIR-GAPPED OFFLINE MULTI-STORAGE

This application is a continuation patent application of U.S. patent application Ser. No. 18/924,633, filed on Oct. 23, 2024 (pending), the entire contents of which are incorporated herein by reference.

BACKGROUND OF THE INVENTION

Technical Field

The present disclosure relates to data storage systems and methods, specifically an air-gapped offline multi-storage security system for sensitive and robust data protection. Securing data storage has become increasingly critical as the volume and sensitivity of digital information continue to grow exponentially. The present disclosure provides an innovative and robust solution to protect the most critical data from various threats, including human error, hardware failures, software vulnerabilities, data breaches, and sophisticated cyberattacks. By leveraging a hardware-isolated, air-gapped storage security system, this solution ensures the ultimate protection of sensitive information, even in the face of growing and evolving cybersecurity challenges.

The present disclosure relates to a data storage security system. More specifically, the present disclosure uses hardware circuitry to create a data storage security system and a method of storing online data to secure air-gapped offline storage.

Background Art

Data security has become an enormous issue in the modern world. Virtually every piece of sensitive information belonging to individuals, companies, the military, and the government is stored in computerized form. Recent massive ransomware and hacker attacks on sensitive information and data cost billions of USD, leading to company crashes and business discontinuity. Today, cyber-criminal security solutions are limited because of the native of the data.

Most of those security solutions are software-based and can be attacked and blocked by cybercriminals. Today, criminals are very sophisticated and well-financed, and it is necessary to switch that fight to another level where we can win and protect our data.

Almost all data is now stored in massive online data stores, accessible at all times from anywhere with an internet connection. While this is most convenient, it is also highly detrimental because the data is always in a place where cybercriminals can attack it.

Also, in general, there is a need for an ultimately safe storage system to store most sensitive data (government, military, nuclear, financial, food industry), where data loss, data change, or data destruction is not an option.

SUMMARY

The present disclosure provides a data storage security system and method of storing online data to secure air-gapped offline storage to fulfill the needs described above and others.

In some embodiments of the subject provided herein, the data storage security system utilizes a double air-gapped bridge including air gap connection or drawbridge 1 016 and air gap connection or drawbridge 2 019, separating online and offline data. It physically prevents any access to secure stored data on offline storage system 056. This hardware drawbridge, dubbed a "double air-gap," ensures that secure stored data is never accessible to the outside world 015.

An air-gap is a security measure that isolates a computer, device, or network and prevents it from establishing an external connection. An air-gapped computer or device is physically segregated and incapable of connecting wirelessly or physically with other computers or network devices. An air-gap protects critical computer systems or data from potential attacks ranging from malware and ransomware or other attacks from malicious actors. (See, e.g., also at the description of an air-gap at: TechTarget.com)

Hardware may act like a double drawbridge that prevents any direct connection between an offline data storage system and an outside world. As described further herein, the system may work on a precise time schedule. When it is time to collect data from the outside world, the dedicated electronic controller process control unit may sever the connection between the transitory R/W storage to the outside world and pull or obtain the data. The process control unit may be an independent controller, such as a programmable logic controller, micro PLC, or any other electronic device programmed for specific tasks. It features tamper-responsive and tamper-resistant properties to enhance security and prevent unauthorized access or manipulation. The tamper-responsive property of process control unit may be designed to detect any physical or electronic interference and respond accordingly. When triggered, it can take actions such as shutting down the system, or alerting the operator. This feature may ensure that any attempt to breach the device triggers an immediate protective response, safeguarding the system and its critical functions. Furthermore, the tamper-resistant property of process control unit may focus on making the device difficult to physically alter or compromise. This can include the use of robust casing, secure fastenings, and encrypted communication protocols, all designed to resist tampering efforts. These features are intended to prevent unauthorized users from accessing or modifying the internal components or programming of the device, thereby enhancing its overall security and integrity.

After finishing previous step, process control unit may disconnect the transitory R/W storage and may turn it OFF. In the next step, the process control unit may establish the connection of the transitory R/W storage to a dedicated cold data storage unit in the offline storage system and take over, such as downloads, the data from transitory R/W storage.

The offline data storage system may be completely isolated from the outside world, with no possibility of unauthorized connection. The system may be designed with a hardware-isolated layer, ensuring there is no physical or logical connection between the two. Furthermore, the data flow may be strictly unidirectional, moving only from the outside world to the offline data storage system. The entire process may be precisely controlled by the process control unit. This system may be designed to be unhackable, meaning it cannot be compromised or broken into in any way. The present disclosure describes the utilization of various security measures to further strengthen data protection capabilities. The use of "double air-gap" isolation may ensure that the secure data stored in the offline storage system is completely inaccessible to the outside world, which may be a key feature of this system.

The offline data storage system may contain or include 2, 3, 4, or more independent cold data storage units. These units may be fully controllable by the process control unit.

Solid-state or hard drive disks may be used for data storage, but this system can accommodate any future storage device.

In some embodiments, four cold storage units may be used, which may also serve to explain the principle of how the system works. The system ensures all data from one transitory R/W storage cycle is obtained, such as downloaded, on one of the cold data storage units of the offline storage system. After the data is received, such as downloaded, the active cold storage unit may turn off, disconnects, and may go into an immutable state.

Next, in some embodiments, the next cold data storage unit, inactive in the previous cycle, may be prepared and connected for a data download from the next transitory R/W storage cycle. Once the data is downloaded, the sold data storage unit may turn off and go into an immutable state.

The system may cycle through the other cold data storage units sequentially from 1 to n, where "n" is a natural number denoting the number of cold storage units. All cold storage units may be turned off and may only become active to receive data from the transitory R/W storage.

The systems may operate on a predetermined time schedule. For example, in a case with four cold data storage units within the offline storage system and a daily cycle, the process may be as follows:

The transitory R/W storage is initiated and connected to the outside world to begin collecting data. Initiating the transitory R/W storage means the system deletes any previously recorded data and prepares a clean transitory R/W storage for the next cycle. After 12 hours, the transitory R/W storage disconnects from the outside world and connects to the prepared cold data storage. The data is downloaded from the transitory R/W storage over the next 12 hours. The transitory R/W storage and cold data storage units are then disconnected.

The transitory R/W storage may be reconnected to the outside world and may collect data for the next 12 hours. In the next step, the transitory R/W storage may disconnect from the outside world, connect to the prepared cold data storage, and download the latest data. This process may be repeated for the third and fourth cold storage units. In the fifth cycle, the algorithm may start again with the first cold data storage unit.

During this daily cycle, the system may ensure that the data is securely transferred from the transitory R/W storage to the cold data storage units in the offline storage system. Each cold data storage unit may receive a complete daily backup, and once the data is downloaded, the unit may be disconnected and go into an immutable state, preventing any further modifications. This provides the user with four daily immutable copies of their data, stored in a completely air-gapped and offline environment, ensuring the highest level of data security and protection against any potential threats or attacks from the outside world.

This described offline storage system may combine the seven most secure backup technologies into a comprehensive single solution, which may provide:

Offline Backup: Data is stored in an offline environment, completely disconnected from any network, ensuring it remains inaccessible to external threats.

Power Off Backup: The storage devices can be powered off, making it impossible for data to be destroyed, stolen, or encrypted by any malicious actors.

Air-Gap Backup: Physical separation, like a drawbridge, between the offline storage and the outside world prevents unauthorized access or connection.

Immutable Backup: Once the data is downloaded to the offline storage units, they enter an immutable state, preventing any further modifications within a specified time frame.

Multi-Copy Backup: Multiple copies of the data are maintained simultaneously, providing additional layers of protection and redundancy.

Time Bank Backup: Older backups are retained, allowing for data restoration from previous points in time in the event of an incident.

Virus-Resistant Backup: The independent offline system cannot execute actions or interact with malicious code, guarding against virus and worm attacks.

In some embodiments, the offline storage system may aim to protect sensitive data from a wide range of potential threats, including data loss, unauthorized changes, theft, hacker attacks, and ransomware data locking. The offline storage system may provide a comprehensive cybersecurity solution that ensures a safe and secure harbor for data, completely isolated from the outside world. In some embodiments, the system stores all data in multiple redundant copies on an offline, air-gapped, immutable offline storage system, offering the highest data protection and resilience against external threats or incidents.

An advantage provided by at least some embodiments is that the stored data cannot be technically accessed or retrieved from the outside world under any circumstances. This may be achieved through the implementation of robust physical and logical isolation measures. The system may employ dual air-gap drawbridges, creating a complete physical separation between offline storage system and outside world. This hardware-level isolation ensures that the cold data storage units may be never directly connected to the outside world, not even during the data recording process. There may be no physical or logical connection between the offline storage system and the external environment. This fundamental design principle may mean that if a component or connection does not physically exist within the system, it cannot be targeted or compromised by external threats, hackers, or attacks. This provides the highest data security and protection against unauthorized access or interference.

Another key advantage of at least some embodiments of the system is the unidirectional data flow, where data can only move from the outside world to offline storage and not in the reverse direction. Additionally, all the offline storage system systems may be controlled by a dedicated electronic or a PLC programmable logic controller pre-programmed with the data transfer schedule. This PLC may ensure that all the cycles and processes are predefined during the initial installation, adhering to a strict time-based schedule for enhanced security and reliability. This rigid control over the data flow and process timing further may reinforce the safeguards against unauthorized access or manipulation of the stored data.

In some embodiments, a hardware-isolated storage security system may contain a unique transitory data store controlled by a PLC or electronic pre-programmed device that prevents external influence. The transitory Read/Write storage connects to the outside world at precisely defined time intervals to download data. After finishing download, it is disconnected from the outside world and connected to the offline storage system, which houses several cold data storage units in a cyclic order. The entire process is unidirectional and strictly controlled by a dedicated independent electronic device, ensuring maximum safety and remote monitoring via isolated unidirectional signals. This storage security system safeguards the most sensitive data when data loss is not an option.

The offline data storage system may present a comprehensive set of ultimate data storage security solutions that are highly resistant to a wide range of potential threats, including hacker attacks, ransomware attacks, technical failures, and human errors. The following detailed description and accompanying drawings will outline exemplary embodiments, advantages, and novel features, which are expected to become apparent to industry professionals during a thorough examination and evaluation of this system.

DESCRIPTION OF THE DRAWINGS

The accompanying Figures illustrate the concept and detailed working method of exemplary embodiments of a data storage security system. These visual aids comprehensively showcase the steps and components of at least some embodiments of this system. The reference numerals used in the figures correspond to the same or similar elements described throughout the detailed description, wherein like numerals are used to denote like elements.

DETAILED DESCRIPTION

Figure 1:
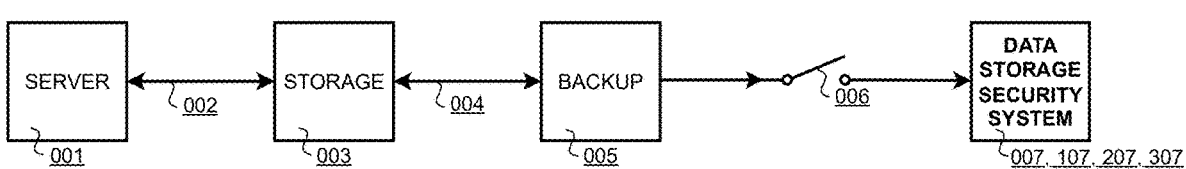
FIG. 1 schematically shows an embodiment of a data storage architecture that employs an embodiment of a data storage security system as shown in FIGS. 2, 3, 6, and 7 according to the present invention.

FIG. 1 illustrates a position of embodiments of data storage security systems 007, 107, 207, and 307 (see FIGS. 2, 3, 6, and 7) within the overall data storage architecture. The data storage architecture includes a classic server 001, or any other computer system, that has a direct connection 002 to its primary data storage 003. This primary data storage 003 is then connected through a direct connection 004 to a regular backup system 005, representing a standard server and backup solution configuration.

The data storage security system 007, 107, 207, and 307 is integrated with this system through a unique air-gap connection 006, providing an additional layer of security and isolation. This configuration allows the data storage security system 007, 107, 207, and 307 to complement any backup solution, computer system, or data repository, offering enhanced data protection and resilience against potential threats.

Figure 2:
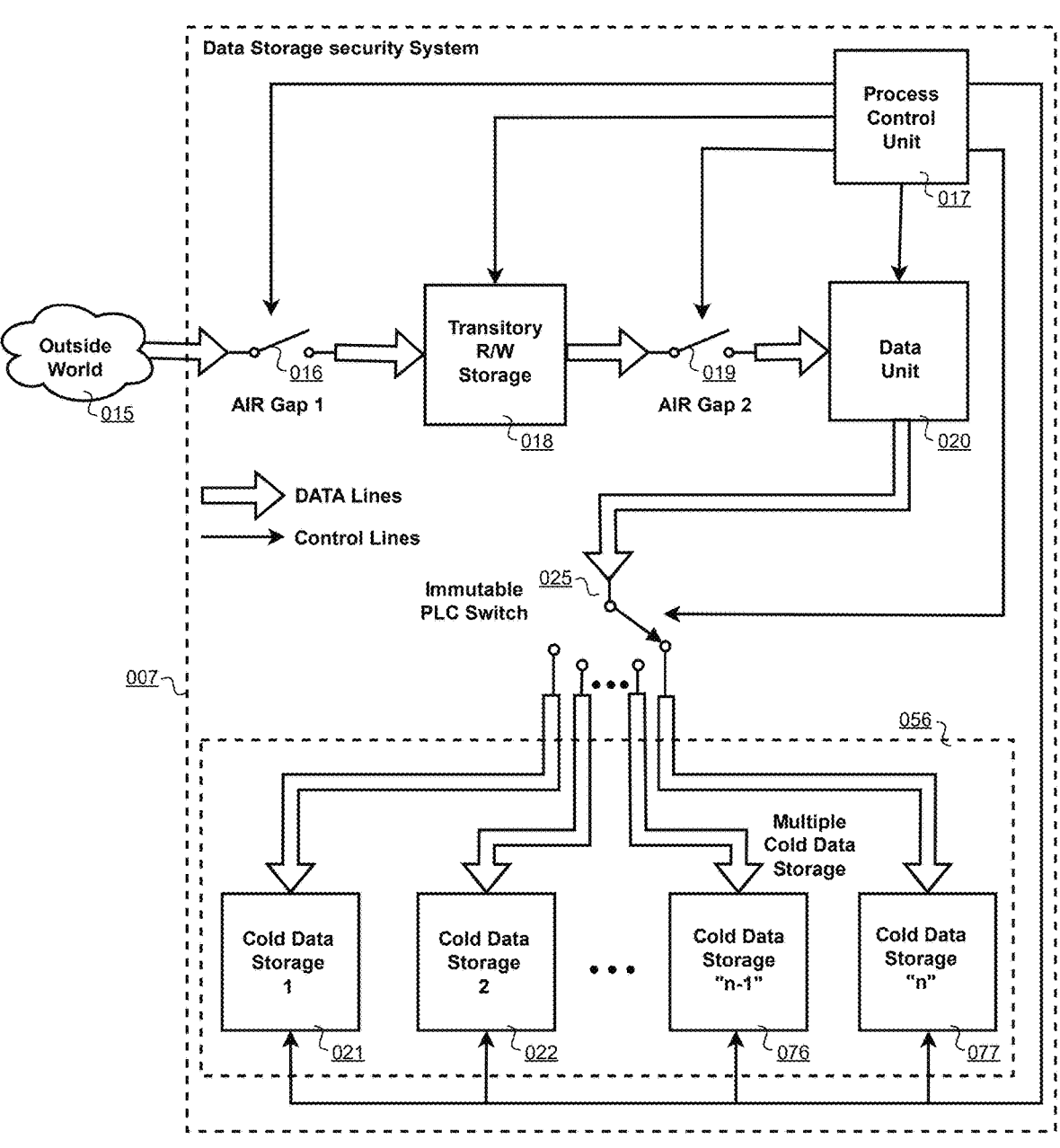
FIG. 2 illustrates a detailed schematic diagram of a first embodiment of a data storage security system able to perform second types of processes with "n" Cold Data Storages.
Figure 3:
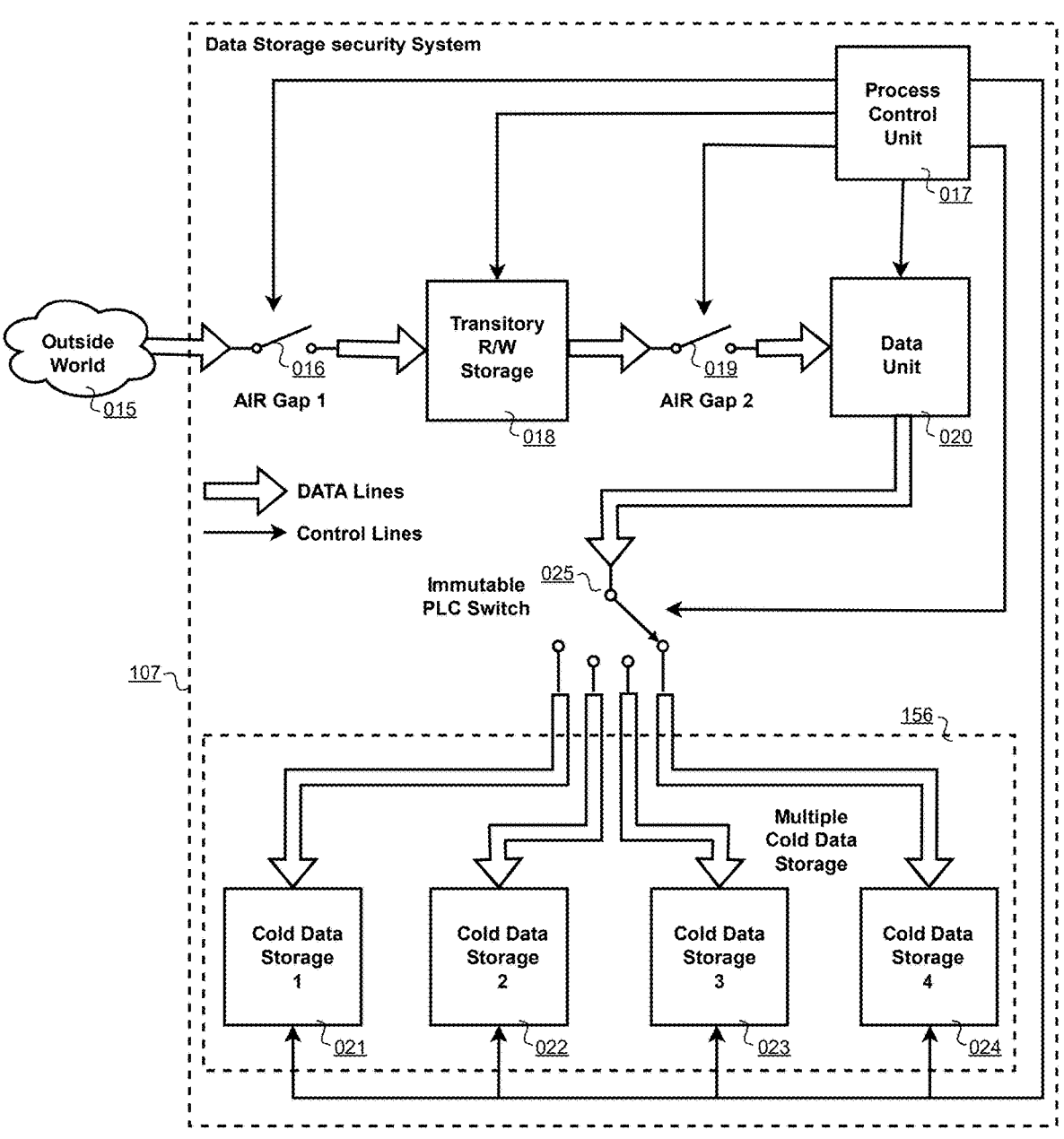
FIG. 3 illustrates a detailed schematic diagram of a second embodiment of a data storage security system with four cold data storage units able to perform a third types of processes.

FIG. 2 presents a schematic diagram depicting the detailed steps and processes of the data storage security system 007. In the example of FIG. 2 and optionally in other examples, the data storage security system 007 includes a number of "n" cold data storage units, wherein "n" is a natural number. In the next paragraph, all steps and processes on an exemplary embodiment with four (4) cold data storage units will be explained:

FIG. 3 presents a schematic diagram depicting the detailed steps and processes of a data storage security system 107—an exemplary embodiment featuring four Cold Data Storage units: 021, 022, 023, and 024. The entire system is self-contained and packaged within a single enclosure. The only component connected to the outside world 015 is the transitory R/W storage 018, accessed through the conditional first air-gap connection 016. This design may ensure that the rest of the data storage security system 107 remains completely isolated and inaccessible from the external environment.

When the data storage security system 107 starts to operate, the process control unit 017 initiates its preprogrammed procedures. These procedures are time-scheduled schemes that engage various components within the system to fulfill the desired tasks. The process control unit 017 is a closed electronic controller that does not connect to the outer world, making it completely unhackable. It is pre-programmed for dedicated users according to their specific needs and requirements.

The process control unit 017 may maintain comprehensive control over every aspect of the data storage security system 107, working strictly within a predefined timeframe scheme to enhance security. The first step in the process is to turn on the transitory R/W storage 018, initialize it, and connect it to the outside world 015 through the first air-gap connection 016. Initializing involves securely deleting all previously recorded data on the transitory R/W storage 018 before starting a new data transfer cycle. After this initialization process, the data download from the user repository begins.

Once the data transfer is concluded, the process control unit 017 turns off the transitory R/W storage 018 and disconnects the first air-gap connection 016. The transitory R/W storage 018 is then turned on again, the second air-gap connection 019 is closed, and it is connected to the data unit 020. The data unit 020 is a well-known computerized controller that can only copy or transfer files from the transitory R/W storage 018 to the offline storage system 056, containing cold data storage units 021, 022, 023, or 024.

When the data is successfully transferred from the transitory R/W storage 018 to the appropriate cold data storage unit 021, 022, 023, or 024, the process control unit 017 turns off the transitory R/W storage 018 and disconnects the second air-gap connection 019. The system is then ready to repeat the process by reconnecting the transitory R/W storage 018 to the outside world 015 through the first air-gap connection 016 to download a new user data set.

As the above description shows, the offline storage system 056 is never directly connected to the outside world 015. It is securely separated via two air gap connections/drawbridges, 016 and 019. So, it is clear that there is no possibility of hackers, ransomware, or any other possible influence on stored data because there is no connection between outside world 015 and cold data storage units 021, 022, 023, 024.

When transitory R/W storage 018 needs to deliver data to the offline storage system 156, it is connected to the data unit 020 via a second air-gap connection 019. The process control unit 017 connects the appropriate cold data storage units 021, 022, 023, or 024 through an immutable PLC or electronic switch 025. The immutable PLC switch 025 is a subsystem directly controllable by the process control unit 017, and it connects the exact cold data storage units 021, 022, 023, or 024 according to a planned order.

For example, in the first cycle, when transitory R/W storage 018 needs to deliver data to the process control unit 017, the system 107 turns on cold data storage unit 021, connects it via the immutable PLC switch 025 to the data unit 020, and the data transfer is started. Once the transfer is finished, the process control unit 017 turns off the cold data storage unit 021 and disconnects it via the immutable PLC switch 025 from the data unit 020. The system 107 is now ready for the next iteration.

In the second cycle, the process control unit 017 turns on cold data storage unit 022, connects it via the immutable PLC switch 025 to the data unit 020, and completes the process. For the third cycle, the process control unit 017 will engage cold data storage unit 023, and the fourth cycle will engage cold data storage unit 024. After all four cold data storage units 021, 022, 023, and 024 have been used, the next cycle will start from cold data storage unit 021, and the described process will continue in a loop.

The data storage security system 107 maintains at least four recent versions of the user data stored across the cold data storage units 021, 022, 023, and 024. For instance, if daily backups are performed, the system would have the current day's backup, the previous day's backup, the backup from two days prior, and the backup from three days prior. This quadruple redundancy provides robust protection against potential failures. Moreover, at any given time, only one of the cold data storage units is active and connected, while the remaining three are turned off, disconnected, and immutable. As described, this design represents an ultimate security data storage system and method for securely preserving highly sensitive data.

Figure 4:
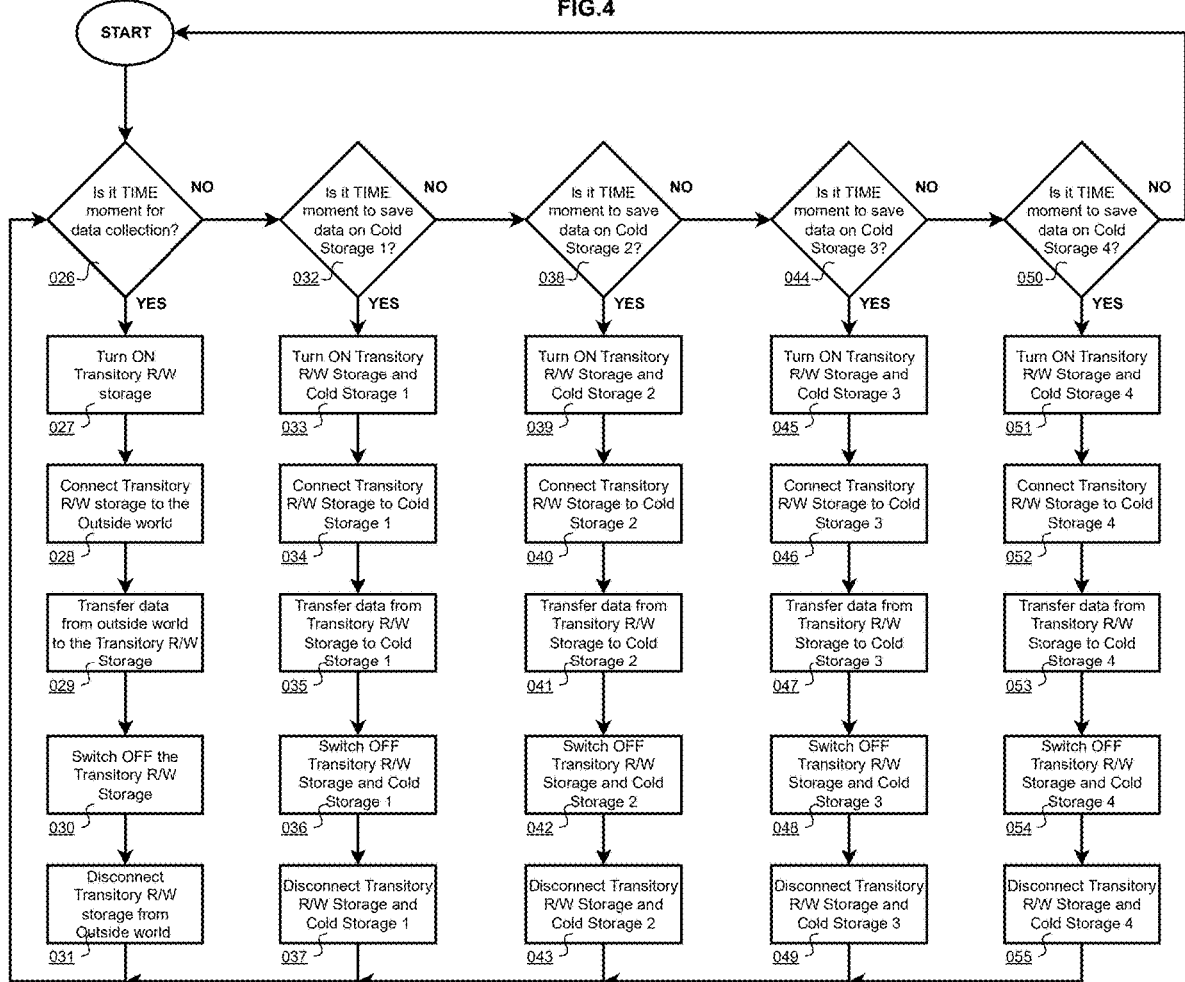
FIG. 4 illustrates a decision tree that details types of processes during the work of the data storage security system of FIG. 3.

FIG. 4 presents a decision flow that outlines the steps the data storage security system 107 took when initiating its operations. The example scenario involves four cold data storage units: 021, 022, 023, and 024. All process cycles commence within a predefined time schedule managed by the process control unit 017. FIG. 4 shows that the system reaches decision box 026 at the initial stage. Since the first requirement is to collect data from the outside world 015, the answer is YES. The system then proceeds to step 027, where the process control unit 017 activates and initializes the transitory R/W storage 018. In the next step, 028, the process control unit 017 connects the transitory R/W storage 018 to the outside world 015 via the first air-gap drawbridge 016. Subsequently, in step 029, the system 107 downloads data from the outside world 015 to the transitory R/W storage 018. After completing this step, the process control unit 017, in step 030, turns off the transitory R/W storage 018. Then, in step 031, the process control unit 017 disconnects the transitory R/W storage 018 from the outside world 015.

The process or algorithm returns to the decision box 026. As data was previously collected from the outside world 015, the answer is NO, and the algorithm proceeds to decision box 032. Since the algorithm needs to transfer the data to the appropriate cold data storage units 021, 022, 023, or 024, the obvious answer is YES. The process control unit 017 then executes step 033, turning on the transitory R/W storage 018 and cold data storage unit 021. In the next step, 034, the process control unit 017 connects the transitory R/W storage 018, data unit 020, and cold data storage unit 021, utilizing the second air-gap drawbridge 019 and the immutable PLC switch 025. Subsequently, in step 035, the data unit 020 transfers the data from the transitory R/W storage 018 to the cold data storage unit 021. Finally, in step

036, the process control unit 017 turns off the transitory R/W storage 018 and the cold data storage unit 021, and in step 037, it the process control unit 017 disconnects the transitory R/W storage 018 and cold data storage unit 021, thereby disconnecting the second air-gap drawbridge 019 and the immutable PLC switch 025.

The algorithm returns to decision box 026. The system can now retrieve data from the outside world 015 once again. Therefore, the answer is YES, and the system initiates steps 027 to 031.

The flow proceeds back to decision box 026. As data was previously collected from the outside world 015, the answer is now NO, and the system advances to decision box 032. The cold data storage unit 021 was utilized in the preceding cycle; now, the system needs to transfer data to the subsequent cold data storage unit 022. Thus, the answer is NO. The algorithm continues to decision box 038 and is required to deliver the data to the next cold data storage unit; the obvious answer is YES. The algorithm progresses to step 039, where the process control unit 017 activates the transitory R/W storage 018 and the cold data storage unit 022. In the subsequent step, 040, the process control unit 017 connects the transitory R/W storage 018, the data unit 020, and the cold data storage unit 022, utilizing the second air-gap drawbridge 019 and the immutable PLC switch 025. In the next step, 041, the data unit 020 transfers data from the transitory R/W storage 018 to the cold data storage unit 022. Finally, in step 042, the process control unit 017 deactivates the transitory R/W storage 018 and the cold data storage unit 022, disconnecting the second air-gap drawbridge 019 and the immutable PLC switch 025.

The algorithm flow returns to decision box 026. The system can now again initiate the data collection process from the outside world 015. The answer is YES, and the system executes steps 027 to 031.

The flow then returns to decision box 026. As data was previously collected from the outside world 015, the answer is now NO, and the algorithm advances to decision box 032. Cold data storage unit 021 was utilized two cycles ago; now, the system must transfer data to the next cold data storage unit 023. Therefore, the answer is NO. The algorithm flow continues to decision box 038. The cold data storage unit 022 was used in the preceding cycle, so the data must be delivered to the subsequent cold data storage unit 023. Accordingly, the answer is NO. The process approaches decision box 044 and needs to transfer the data to the next cold data storage unit 023; the logical response is YES. The algorithm then proceeds to step 045, where the process control unit 017 activates the transitory R/W storage 018 and cold data storage unit 023. In the subsequent step 046, the process control unit 017 connects the transitory R/W storage 018, data unit 020, and cold data storage unit 023, utilizing the second air-gap drawbridge 019 and the immutable PLC switch 025. Next, step 047, the data unit 020 transfers data from the transitory R/W storage 018 to the cold data storage unit 023. In the following step, 048, the process control unit 017 deactivates the transitory R/W storage 018 and the cold data storage unit 023. In step 049, the process control unit 017 disconnects the transitory R/W storage 018 and the cold data storage unit 023, disconnecting the second air-gap drawbridge 019 and the immutable PLC switch 025.

The algorithm flow returns to the decision box 026. The system can initiate a new data collection process from the outside world 015. Consequently, the answer is YES, and the system executes steps 027 to 031.

The algorithm returns to decision box 026. Since data was previously collected from outside world 015, the answer is now negative, and the system proceeds to decision box 032. The cold data storage unit 021 was utilized three cycles ago, so the algorithm must transfer data to the next cold data storage unit 024. If the response is negative, the algorithm continues to decision box 038. The cold data storage unit 022 was used two cycles prior; now, the algorithm must deliver data to the next cold data storage unit, so the answer is negative.

The algorithm then advances to decision box 044. Cold data storage unit 023 was used in the most recent cycle; the algorithm must transfer data to the subsequent cold data storage unit. The answer is negative. The algorithm approaches decision box 050 and needs to deliver the data to the next cold data storage unit 024, utilizing the second air-gap drawbridge 019 and immutable PLC switch 025. In the next step, 053, the data unit 020 transfers data from the transitory R/W storage 018 to the cold data storage unit 024. In the following step, 054, the process control unit 017 turns off the transitory R/W storage 018 and the cold data storage unit 024. In step 055, the process control unit 017 disconnects the transitory R/W storage 018 and the cold data storage unit 024, disconnecting the second air-gap drawbridge 019 and the immutable PLC switch 025.

The algorithm returns to decision box 026, and the process starts anew because all four cold data storage units, 021, 022, 023, and 024, have been utilized. This continuous process operates repeatedly while the data storage security system 007 is active. The process outcome is evident: four independent copies of protected data are stored on immutable, turn-off storage.

Figure 5:
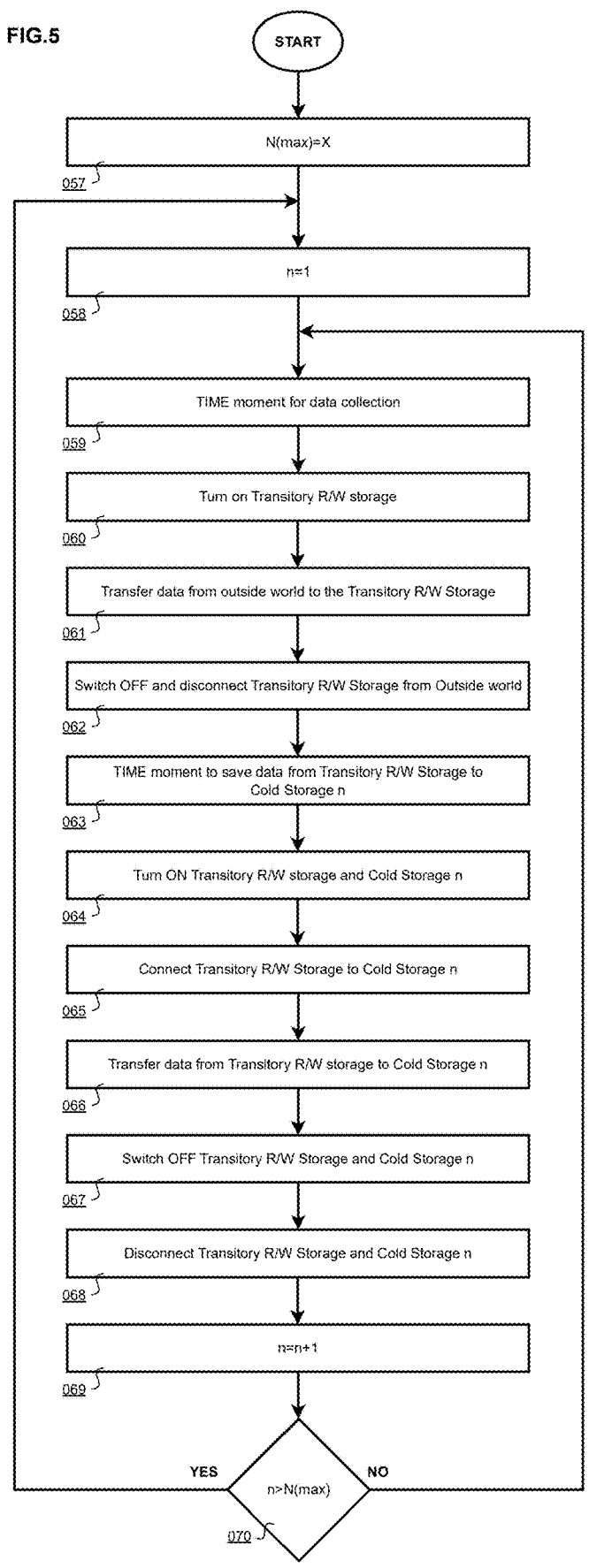
FIG. 5 illustrates a type of data storage security method performed by the data storage security system of FIG. 2 with any number "n" of cold data storage units, e.g., with 2, 3, 4, 6, 8, 16 . . . "n", etc.

FIG. 5 presents a data storage security method that can accommodate any number "n" of cold data storage units, such as 2, 3, 4, 6, 8, 16, or more. This method is similar to FIG. 4 but applies to any number of cold data storage units "n" 077 in the offline storage system 056.

All process cycles may start on a predefined schedule managed by the process control unit 017. As shown in FIG. 5, the first step when the data storage security system 007 starts is step 057, which defines N=X, where "X" is the number of available cold data storage units. In the next step, 058, the internal counter is set to n=1. The next cycle will be n=2, as the counter increases in step 069. In any further cycle, "n" will increase by +1. When "n" reaches N, the system will start the process anew, as indicated in the diagram.

The next step, 059, is the time for data collection from the outside world 015. Proceeding to the next step, 060, the system turns on the transitory R/W storage 018, reinitializes it, and prepares for collecting data from the outside world 015. Next, in step 061, the system starts the data transfer from the outside world 015 to the transitory R/W storage 018. In step 062, the system switches off and disconnects the transitory R/W storage 018 from the outside world 015. In step 063, it is time to transfer data from the transitory R/W storage 018 to the cold data storage unit "n" 077, where "n" is the number from the internal counter. In step 064, the system turns on the transitory R/W storage 018 and the cold data storage unit "n" 077. In step 065, the system connects the transitory R/W storage to the cold data storage unit "n" 077. In step 066, the data transfer starts from the transitory R/W storage 018 and moves to the cold data storage unit "n" 077. After that, in step 067, the system switches off the transitory R/W storage 018 and the cold data storage unit "n" 077. In the next step, 068, the system disconnects the transitory R/W storage 018 and the cold data storage unit "n" 077. After completing one cycle in step 069, the algorithm increments the internal counter, n=n+1. The algorithm is coming to decision box 070, which checks if n>N. If the answer is NO, the flow goes for the next cycle from step block 059. When the algorithm finishes all cycles and saves data on all cold data storage units "n" 077, the internal counter will reach a number greater than N, and in that case, from decision box 070, the answer is YES. The algorithm then continues with the next step in block 058, where the algorithm "resets" n to n=1, starting the cycles from the beginning. This continuous process works repeatedly while the secure storage system is turned on.

The proposed data storage security system 007 generates "n" independent and immutable copies of the protected data stored on turn-off storage devices.

Figure 6:
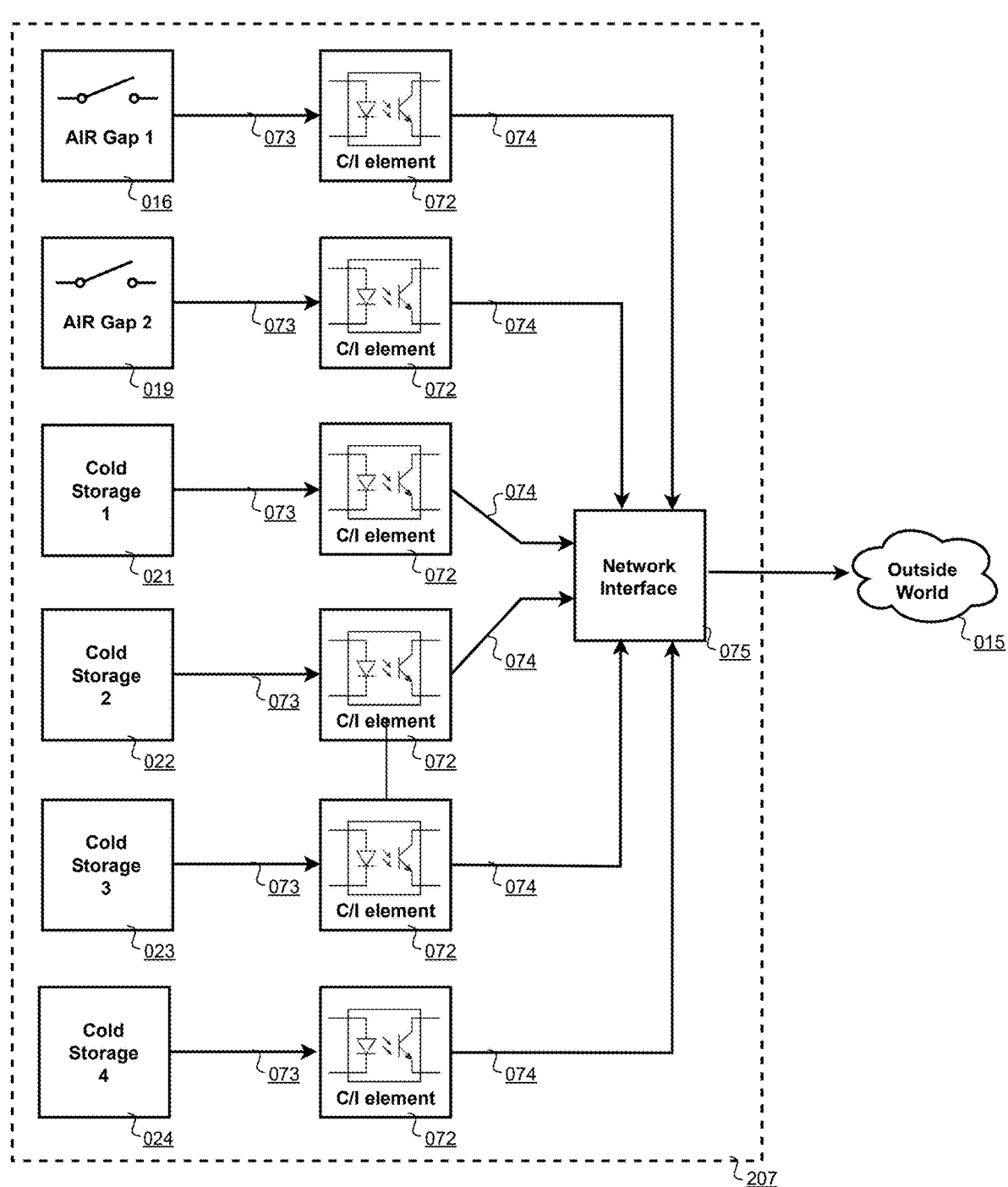
FIG. 6 illustrates a third embodiment of a data storage security system that has unidirectional remote monitoring with signal-isolated layer.

FIG. 6 presents a schematic diagram of the data storage security system 207 monitoring component. This real-world example showcases four cold data storage units: 021, 022, 023, and 024. The entire system is contained within a single enclosure. Only one portion of the system, the network interface 075, can communicate with the outside world 015 in a unidirectional manner, solely transmitting status signals.

When the data storage security system 207 is installed, preprogrammed, and operational, there is a need to monitor the ongoing internal processes and system status. Full remote monitoring is crucial since the most critical data are stored within the data storage security system 207. We continuously monitor air gap connection or drawbridge 1 016, air-gap connection or drawbridge 2 019, and the four cold data storage units 021, 022, 023, and 024.

An active signal light indicates the specific ongoing operations when a particular component is engaged. This signal information needs to be relayed to the outside world 015. All signal lines are connected to communication isolation element 072 elements, which prevent any harmful external influence on the device. The communication isolation element 072 may be an optocoupler. The communication isolation element 072 is a semiconductor device that allows an electrical signal to be transmitted between two isolated circuits, examples of which include optocouplers, digital isolators, fiber optic systems, and others. As shown in FIG. 6, every monitoring signal 073 is translated into an optically isolated signal 074 and then delivered to the network interface 075.

When the status signal information is transmitted to outside world 015, a dedicated application presents all the signals and operational data, allowing continuous monitoring. In the event of any irregularities, the application will alert the operator.

Figure 7:
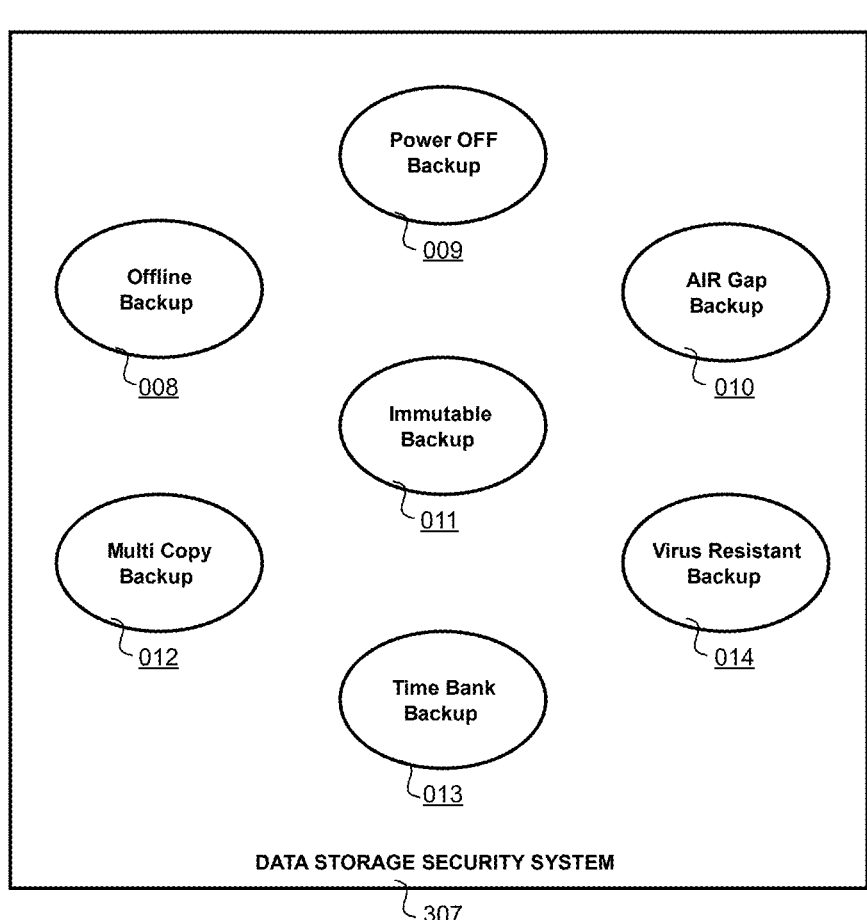
FIG. 7 illustrates a schematic diagram of a fourth embodiment of a data storage security system that employs all advanced backup technologies.

FIG. 7 illustrates the advanced backup technologies incorporated into the data storage security system 307:

Offline backup 008: Data is stored in an inaccessible backup not directly connected to any network, providing high isolation and security.

Power off backup 009: Data storage devices are unplugged, making it impossible to destroy, steal, or encrypt the data if the storage unit is turned off.

Air gap backup 010: The stored data is physically separated from the outside world, like a drawbridge, creating complete isolation.

Immutable backup 011: One or more copies of the data are immutable within a specified timeframe, providing additional protection against unauthorized modifications.

Multicopy backup 012: Multiple copies of the stored data are at any given time, ensuring data redundancy and resilience.

Timebank backup 013: There are multiple "older" backups, such as from yesterday, the day before, and so on, allowing the system to restore the latest valid data in case of an incident.

Virus resistant backup 014: Data is stored on an independent system that cannot execute actions or interact with malicious code or worms, providing protection against viruses and malware.

The expert or academic community may propose revisions or improvements to the presented system designs. Such modifications can be incorporated without departing from the core principles and scope of the original invention or undermining its associated advantages. A feature or a combination of features mentioned with regard to one embodiment may also be present in another embodiment, even though this may not be explicitly mentioned.

The invention claimed is:

1. A data storage security system comprising:
an end-user device;
a transitory R/W storage unit conditionally connected to an outside world via a first air gap connection or to an offline storage system via a second air gap connection;
a process control unit that controls all data cycles according to a predefined schedule and is equipped with tamper-responsive and tamper-resistant properties to protect against unauthorized access;
a plurality of "n" cold data storage units that are never directly connected to the outside world and are protected from unauthorized access, wherein "n" is a natural number;
an immutable PLC switch that connects the plurality of cold data storage units to a data unit and the second air gap connection to the transitory R/W storage unit;
wherein unidirectional data transfer from the outside world to the offline storage system for enhanced security, and system status communication and monitoring through isolated communication isolation element connections to prevent external tampering is accomplished by the data storage security system.

2. The data storage security system of claim 1, comprising:
at least n−1 of the plurality of cold data storage units are/is configured to turned off and being immutable at any given time, ensuring only one of the plurality of cold data storage units is active during the unidirectional data transfer.

3. The data storage security system of claim 1, wherein the process control unit initiates and manages data collection by first activating the transitory R/W storage unit and connecting the transitory R/W storage unit to the outside world through the first air gap connection to retrieve data, with tamper-responsive properties that detect and react to any tampering attempts by shutting down or wiping data.

4. The data storage security system of claim 1, wherein the transitory R/W storage unit is deactivated and disconnected from the outside world after collecting data and then reconnected to the designated one of the plurality of cold data storage units for data transfer via the second air gap connection.

5. The data storage security system of claim 1, wherein each of the plurality of cold data storage units is configured to be immutable when not in use, further enhancing the system's resistance to unauthorized access or tampering through tamper-resistant and tamper-responsive measures.

6. The data storage security system of claim 1, wherein the process control unit is configured to support remote monitoring of operations of the process control unit through a dedicated network interface, with all signals optically isolated via communication isolation elements to prevent external interference.

7. The data storage security system of claim 1, wherein the data storage security system is configured to supports unidirectional data transfer from the outside world to the offline storage system for maximal security, preventing unauthorized data leakage.

8. The data storage security system of claim 1 further comprising a mechanism configured to initiate a data transfer cycle based on predefined schedules or upon receiving specific external commands, with all operations governed by the process control unit.

9. The data storage security system of claim 1, wherein the plurality of cold data storage units are configured to be connected and utilized in a predefined sequential order, and after all units have been used, the system is configured to cycle back to the first unit.

10. The data storage security system of claim 1, wherein the data storage security system is configured to automatically cycle through each of the plurality of cold data storage units in sequence, ensuring that only one of the plurality of cold data storage units is active at a time while all other ones of the plurality of cold data storage units remain powered off and inaccessible.

11. The data storage security system of claim 1, wherein the process control unit is configured to reset an internal counter to n=1 after all of the plurality of cold data storage units have been used, thereby initiating a new data storage cycle.

12. A method for securely storing data in a data storage security system, the method comprising:
performing a process for a data storage security system comprising:
activating a transitory R/W storage unit and connecting the transitory R/W storage unit to an outside world via a first air gap connection to retrieve data;
deactivating and disconnecting the transitory R/W storage unit from the outside world via the first air gap connection;
connecting the transitory R/W storage unit via a second air gap connection to one of a plurality of cold data storage units through a data unit and an immutable PLC electronic switch;
transferring data to the one of the plurality of cold data storage units, followed by deactivating and disconnecting the transitory R/W storage unit from the one of the plurality of cold data storage units via the second air gap connection;
repeat the process sequentially for remaining ones of the plurality of cold data storage units, ensuring that only one of the plurality of cold data storage units is active at any given time while the remaining ones of the plurality of cold data storage units remain turned off and immutable.

13. The method of claim 12, wherein a process control unit enforces tamper-resistant measures throughout the process and responds to tampering attempts by initiating protective actions.

14. The method of claim 12, wherein each of the plurality of cold data storage units "n" is a memory storage device selected from a group consisting of: solid-state drives (SSDs), hard disk drives (HDDs), helix storage, and quantum storage.

15. The method of claim 14, wherein the memory storage device for each of the plurality of cold data storage units "n"

is selected from the group consisting of: solid-state drives (SSDs), hard disk drives (HDDs), helix storage, and quantum storage.

16. The method of claim 12, wherein the data storage security system supports a sequential cycle through the plurality of cold data storage units, ensuring that each of the plurality of cold data storage units is utilized one by one, with the process repeating once all the plurality of cold data storage units have been used.

17. The method of claim 12 further comprising remote storage and transfer operations monitoring through optically isolated connections to prevent tampering or unauthorized access.

18. The method of claim 12, wherein the plurality of cold data storage units are completely isolated and inaccessible by any hacker or ransomware due to the air-gapped design and use of immutable offline storage.

19. The method of claim 12, wherein the data storage security system cycles through the plurality of cold data storage units in a predefined order and automatically resets to a first one of the plurality of cold data storage units once the cycle sequence is complete.

\* \* \* \* \*